UNITED STATES PATENT OFFICE.

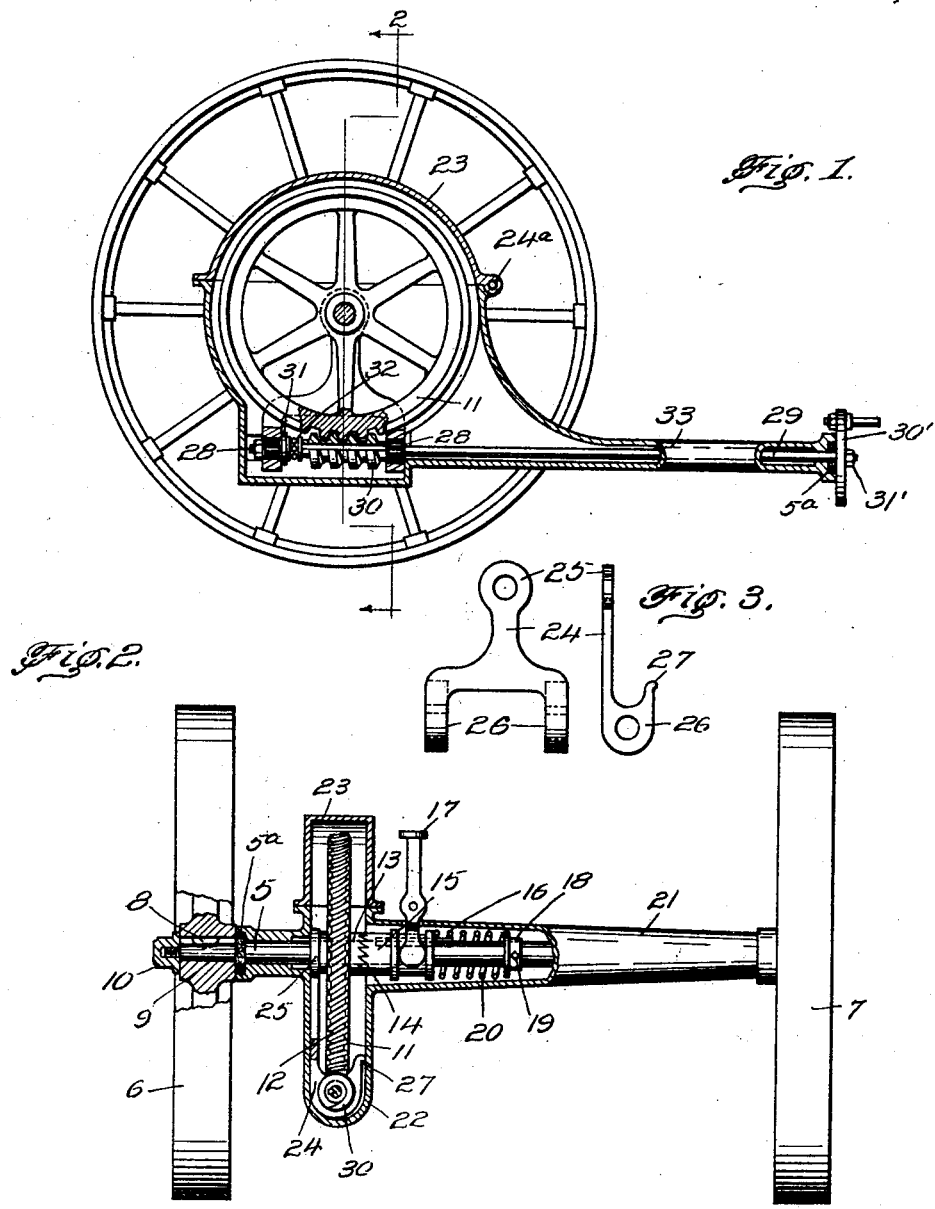

CLAUDE H. McCLURE, OF OAKTOWN, INDIANA.

WORM-GEAR.

1,394,852.

Specification of Letters Patent.

Patented Oct. 25, 1921.

Application filed February 9, 1921. Serial No. 443,690.

*To all whom it may concern:*

Be it known that I, CLAUDE H. MCCLURE, a citizen of the United States, residing at Oaktown, in the county of Knox and State of Indiana, have invented certain new and useful Improvements in Worm-Gears, of which the following is a specification.

This invention relates to gearing for mowing machines, reapers, binders, and similar machinery and more particularly is directed to a novel type of worm gear for communicating power to a rotating element.

The primary object of the invention is the provision of a novel and improved type of worm gearing for agricultural machinery in which the rotating axle and worm gears driven thereby are entirely inclosed in an oil tight housing or casing thereby preventing the admission of dust or dirt and also keeping the parts well lubricated.

Another object of the invention is the construction of a worm gear and an oil tight casing or housing therefor adapted to be mounted on the drive shaft of various types of agricultural machines including provision for clutching and unclutching the gearing from the driven shaft and thus throw the rotating element into its operative or inoperative position as desired.

A still further object of the invention will be found to consist in a novel and improved design of worm gearing and a sectional, hinged, oil tight casing or housing therefor to permit ready access to said gearing without removing the same from the machine, including a novel hanger for one of the coöperating gears adapted to be positioned within the housing.

An additional and very important object of the invention resides in a worm gearing and oil tight casing for agricultural machinery which will be extremely simple in construction, consisting of comparatively few parts therefore inexpensive to manufacture, positive and efficient in operation, rigid and durable to withstand rough usage and of universal application in connection with various types of machines wherein continuous power is desired.

With these objects in view and others which will be manifest and suggested as the purpose and nature of my invention are revealed in the following specification and drawings wherein I have shown a preferred embodiment thereof, Figure 1 is a side view partly in section showing the gearing and housing.

Fig. 2 is a view taken on a line 2—2 of Fig. 1.

Fig. 3 is a detailed view of the hanger.

Referring now to the drawing wherein similar numerals designate like and corresponding parts in the specification, 5 designates an axle provided with the usual ground engaging wheels 6, 7 which may be keyed as at 8 on the spindle 9 of said axle and retained thereon by a threaded nut 10 as clearly shown in Fig. 2 of the drawing. Positioned on the axle 5 and in proximity to one of the ground wheels, I have provided a large gear 11 having the curved teeth 12 on its outer periphery, said gear of course rotating with said axle during the forward movement of the machine. The hub portion 13 of the large gear is also provided with clutch teeth 14 for engagement with a clutch collar 15 slidable and keyed on the axle 5 as shown at 16 whereby the gear may be thrown in and out of operation by the foot lever 17. A collar 18 adjustably secured by a set screw 19 on the shaft constitutes a bearing for a resilient spring 20 which bears against the slidable clutch collar and normally retains the same in mesh and coöperation with the clutch teeth of the hub 13. A housing or casing 21 confines the axle 5 being provided with felt washers 5$^a$ to hold the lubricant in the housing and is formed integral with a bottom section 22 which confines the large gear wheel, thus constituting a noiseless gearing owing to the same running in heavy oil. The top section of the housing is preferably hinged at 24$^a$ so that the same may be swung upwardly to permit access to the gearing or introduce a suitable lubricant therein.

Loosely supported on the shaft 5 and in close proximity to the large gear, I have shown a hanger 24 provided with an eye 25 whereby the same may be supported on the shaft, said hanger terminating in a pair of alined bearings 26 and having a curved upward extension 27, said bearings being adapted to receive anti-friction devices or roller bearings 28 therein and supporting a longitudinally extending shaft 29 which is provided with the worm 30 coöperating with the large gear above referred to. A washer 31 and thrust bearings 32 are also provided on said shaft and within the lower section of the housing. The longitudinally extending shaft 29 is also entirely incased within a housing 33 forming a continuation of the housing 22, and thus it will be seen that the entire operative mechanism of the gearing is entirely inclosed to prevent the admission of dust or dirt and in addition to permit the part to be lubricated at all times. Any suitable form of rotating element 30 may be secured as at 31' to the forward terminal of the longitudinal shaft whereby power may be communicated thereto by the forward movement of the machine.

In actual use and operation of the machine, it will be readily seen that the foot lever 17 may clutch or unclutch the collar 15 from the large gear and thus throw the rotating element into operative or inoperative position as desired. When the lever is released the spring will automatically throw the clutch into operative position as is readily understood and clear from the section of Fig. 2 of the drawing.

In the accompanying drawings, I have illustrated my invention embodied in one form by way of example, and which in practice has been found to be highly satisfactory in obtaining the desired results. It will be obvious however that other embodiments may be adopted and that various changes in the details of construction may be resorted to by those skilled in the art without departing from the spirit and scope of the invention. It is furthermore understood that the invention is not necessarily limited or restricted to the precise elements shown except in so far as such limitations are specified in the subject matter being claimed.

Having shown and described my invention, what I now claim as new and desire to secure by Letters Patent of the U. S. is:—

1. The combination of a drive shaft and supporting wheels therefor, a large toothed gear positioned in proximity to one of said wheels and rotatable by said shaft, an integral housing for said shaft and toothed gear, a hanger having alined bearings suspended from said shaft within the housing, a longitudinally extending shaft and a worm gear carried thereby coöperating with said large gear and journaled in said bearings, a housing for said longitudinally extending shaft and worm gear and a hinged cover for the top of said large gear housing.

2. The combination of a driven shaft and supporting wheels therefor, a large toothed gear having clutch teeth thereon, positioned in proximity to one of said wheels and rotatable by said shaft, a clutch collar slidable on said shaft and engageable with the clutch teeth of said gear, a foot lever and resilient means for throwing said members into operative and inoperative position, an integral housing for said shaft and toothed gear, a freely suspended hanger having alined bearings carried by said shaft and within the housing, a longitudinally extending shaft and a worm gear carried thereby coöperating with the said large gear and journaled in said bearings, a housing for said longitudinally extending shaft and worm gear and a hinged cover for the top of said large gear housing.

In testimony whereof I affix my signature hereto.

CLAUDE H. McCLURE.